Patented Apr. 26, 1949

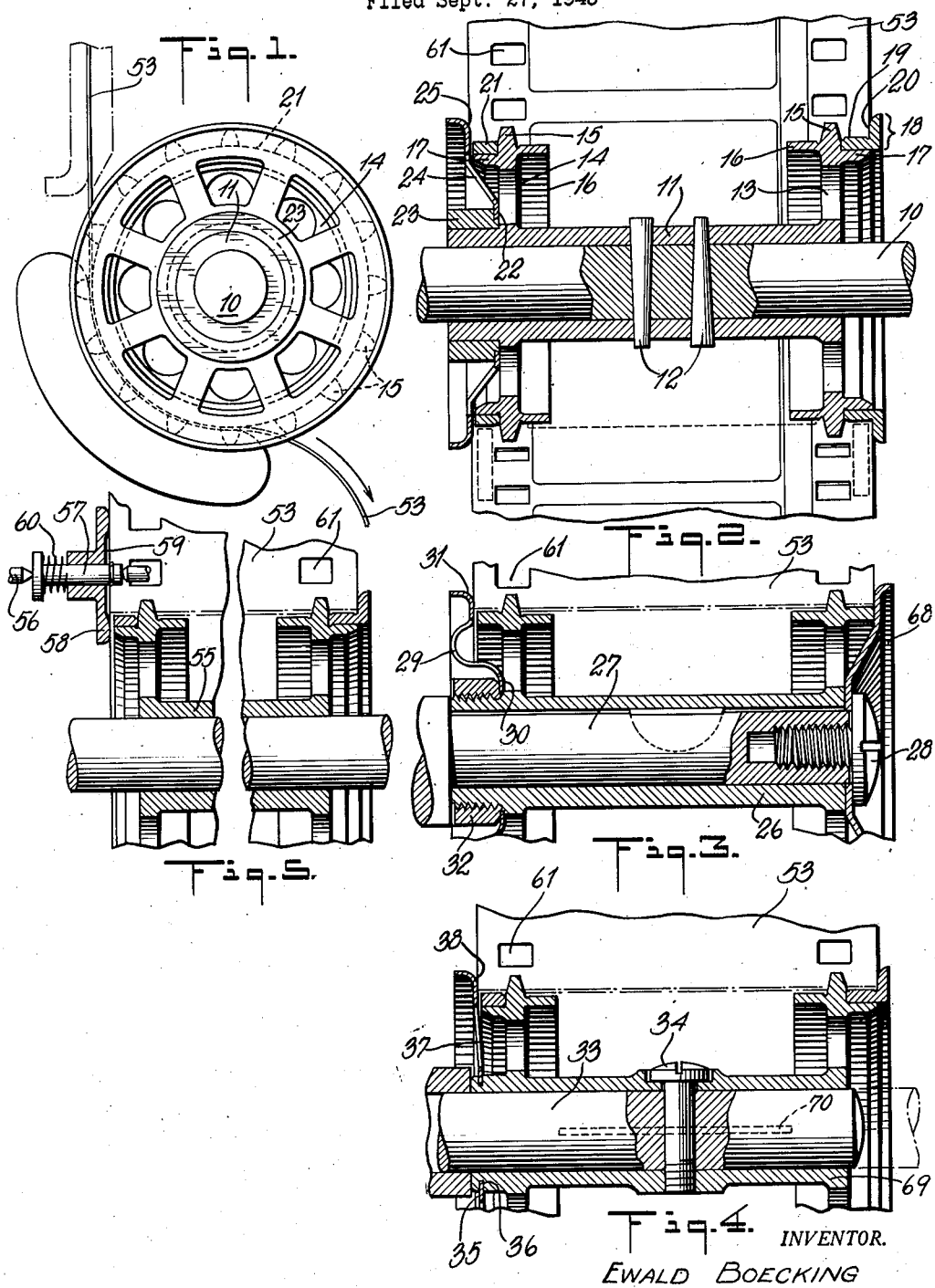

2,468,025

UNITED STATES PATENT OFFICE 2,468,025

MOTION-PICTURE FILM MECHANISM

Ewald Boecking, Great Kills, N. Y., assignor to Manufacturers Machine & Tool Co., Inc., Mount Vernon, N. Y., a corporation of New York Application September 27, 1943, Serial No. 503,997

2 Claims. (Cl. 74—243)

This invention relates to motion picture film mechanism and more particularly to a sprocket mechanism having lateral film guiding means. One object of the invention is to provide a light and simple high-speed sprocket wheel for intermittently driven film which has lateral guiding means that will prevent lateral movement despite variations in width of the film. It is characteristic of the invention that the mechanism has a fixed shoulder for one edge of the film and a resilient rotating shoulder for the other edge.

In the drawings:

Fig. 1 is a side elevation of a sprocket mechanism embodying one form of my invention, showing same employed as a guide for the film in a projector;

Fig. 2 is a view in vertical longitudinal section through the sprocket mechanism shown in Fig. 1, with the axle partly broken away;

Fig. 3 is a vertical longitudinal section through a modified embodiment in which the resilient guide is curvilinear in shape;

Fig. 4 is a view similar to Fig. 3, of another modification, showing a different method of assembling the parts of the mechanism and a resilient guide of another shape;

Fig. 5 is a view similar to Fig. 3, of a further modification in which the resilient guide includes a separate wheel which is tensioned by an external spring, showing, however, only the two ends of the carrying means.

In motion picture apparatus it is customary to move the film through the various machines such as cameras, developers, projectors, etc., by sprocket mechanism having teeth engaging perforations near one or both edges of the film, but for various reasons these perforations are greater in width than the teeth which engage them. It therefore follows that lateral registry of the film is not obtained perfectly from the sprockets, and lateral guiding means for the film are necessary where, as in a projector or camera, it is necessary to have the film register accurately. The material of which film is made is such that it sometimes tends to shrink with the passage of time, and film therefore is not always of an absolutely uniform width. Furthermore it shrinks longitudinally and that shrinkage may be uneven from side to side so that the film is laterally wavy. Because of these facts, it is impossible to use fixed guides on both ends of the film-carrying means and no satisfactory way has heretofore been known to prevent lateral weaving or motion of the film 53 within the limits of the sprocket holes 61. It will be obvious to those skilled in the art that this small movement can have a tremendous effect on the picture as projected on the screen, whether it occurs in the camera, in the processing or in the projector. It has also been found that this lateral weaving increases the wear and tear on the film, particularly in the form of motion picture projectors now used where the film is advanced intermittently at high speed, with consequent jerks on the film.

It is customary in making motion picture cameras, projectors, etc., to provide a fixed guide at one edge of the film and to gauge and measure lateral dimensions of the machine from that guide. This guide alone cannot prevent lateral weaving, and owing to variations in width of films it follows that due to shrinkage it is not possible to expect two fixed guides to stop the weaving.

I have discovered that these defects can all be eliminated by providing a fixed guide for one edge of the film and a resilient rotating guide engaging the other edge of the film. Due to this resilience the space between the two guides or shoulders is adjusted to the exact width of the film at the moment of passing over the film-carrying means or sprocket drums, and lateral weaving of the film is avoided. As shown in Figs. 2, 3, and 4, this resilient or elastic guide may be a shouldered disk or plate mounted on the carrying means or sprocket, or it may be a smaller roller adjacent the barrel of the sprocket wheel, spring-pressed against the edge of the film, as shown in Fig. 5.

Referring now to Fig. 2, in the sprocket wheel there is an axle or shaft 10 on which the hub of a barrel 11 is fixed by means of two tapered pins 12. Preferably formed unitarily with this barrel, are two sprocket drums 13, 14 which carry the sprocket teeth 15 and provide resting places for the film 53 for a short distance inside of the sprocket teeth. These teeth engage in the perforations 61 in the film to guide or drive the film forward, as the case may be. As shown in Fig. 2, these drums each have inwardly extending shoulders 16 and rims 17 extending laterally beyond the sprocket teeth 15. In this particular embodiment of the invention the fixed guide 18 is carried by and turns with one of the rims 17. The thickness of the leg 19 of the guide 18 is such that it affords a surface between the sprocket teeth 15 and the face 20 of the guide which is slightly greater in diameter than the adjacent inwardly extending shoulder 16, and the film therefore tends to rest on this surface of the guide rather than on the inwardly extending shoulder.

In Fig. 2 the end of the mechanism having the resilient guide has a drum 14 which is an exact duplicate of the drum 13 at the other end, and a positioning ring 21 is provided around the outwardly extending rim 17 of this drum to bring the surface between the sprocket teeth and the guide to the same level as the similar space on the drum 13. In this embodiment of the invention the resilient guide is attached to the drum at or near the barrel 11 and it is so constructed that its resilient pressure against the edge of the film is due to bending of the guide between its point of attachment near the barrel and the periphery of the guide opposite the sprocket teeth.

Specifically, this guide or shoulder comprises a disk or washer of thin resilient metal with a center 22 having an opening permitting it to be fitted over the barrel. The center around this opening is recessed and is held on the barrel by a wedge 23 which presses it against the center of the drum 14. From this recessed center 22 the resilient guide extends outwardly and laterally through a bent portion 24 which brings it to a point laterally a slight distance beyond the rim 17 and the positioning ring 21. The guide then extends past the rim and ring in a radial direction parallel to the edge of the film for a distance extending beyond the sprocket teeth 15 where it has an outwardly turned edge 25 made with a sloped curve so that the edge of the film will not catch on it. The guide or washer may be perforated for lightness, leaving spokes as shown in Fig. 1. The elasticity of the material of which the guide is made is such that the bent portion 24 and the outwardly turned edge or guiding portion 25 tend to hold the edge of the film resiliently toward the guiding portion or face 20 of the fixed guide 18. It will be seen that this guide will move back when a non-shrunk section of film is passing, though continuing to hold it against the face of the fixed guide, or will also hold a narrow or shrunken piece of film against the fixed guide by moving in toward the rim and ring. This decreases the wear and tear on the sprocket teeth and the holes in the film, and eliminates noise.

The construction shown in Fig. 3 functions in much the same manner but provides a construction in which the parts are more easily replaced. Thus the barrel 26 is keyed to the shaft 27 on which it is mounted, the high surfaces laterally outside of the sprocket teeth (which in Fig. 2 were supplied by one leg of the fixed guide and by the positioning ring) are now made integrally with the drums and both guides are removably attached at points near the barrel. Thus the fixed guide 68 is shaped almost exactly like the resilient guide of Fig. 2 but is made of heavy non-resilient metal and is fastened onto the end of the shaft 27 by means of a screw 28. The shaft is of such a length that when this screw is turned tight it holds the fixed guide tight between its head and the end of the barrel, thereby holding the sprocket on the shaft. The resilient guide is shaped somewhat like the resilient guide of Fig. 2 but instead of the angle bend 24 there is an S-shaped or return bend 29 between the center 30 and the guiding face or periphery 31. This form provides additional resilience. This resilient guide is shown fastened between the barrel and the drum by a nut 32 threaded on the end of the barrel.

In some ways, Fig. 4 resembles Fig. 2 more closely than Fig. 3. The sprocket drums are fastened on the shaft 33 by a screw 34 fastened through the midpoint of the barrel 69 and the shaft at right angles thereto. The barrel is split at 70 to permit this. The drum 13 and the fixed guide are the same as in the embodiment of Fig. 2 but the exact shape of the resilient guide and the manner of its mounting in Fig. 4 differ slightly from those of Fig. 2. In Fig. 4 the center 35 of the resilient disk is set in a slot 36 in the barrel at a point opposite the outer edge of the rim and ring of the drum 14, and the angular portion 37 is therefore not at such a great angle as in the case of Fig. 2. The peripheral portion or guiding face 38 is the same as in the case of Fig. 2, both as to shape and location. The resilience of the metal in the guide of Fig. 4 is such that if the film were extremely narrow the guide would come to rest against the outer edge of the rim and ring, as in the case of Fig. 2.

Fig. 5 introduces a slightly different form of obtaining the resilience in that it provides a compression spring which tends to hold the resilient guide against the edge of the film. In this figure the spring and shoulder are mounted on a center different from that of the barrel and the sprocket drum.

The construction in Fig. 5, which is the preferred form of my invention, is the same as the construction in Fig. 2 except with regard to the resilient shoulder. In Fig. 5 the resilient shoulder is mounted on a different center than the barrel 55 of the sprocket drum proper by means of two points 56 facing toward each other and located peripherally a short distance outside the perimeter of the sprocket drum. Revolving between, and carried by these two opposed pointed pins 56, is a short shaft 57 on which is mounted a disk 58 turning with the shaft. This needle-point bearing for the disk located outside the film edge permits the disk to turn with the greatest of ease merely as a result of its contact with the edge of the film. This disk presents to the film a face recessed at its center at 59 and providing resilient pressure against the edge of the film by virtue of a compression spring 60 mounted on the shaft 57. The spring takes against a head on the shaft 57 and revolves with the shaft and disk. With the exception of the location of the resilient shoulder, the similarity to the form of Fig. 2 will be apparent.

It will be noted in all these constructions that the invention lends itself to maintenance of lightness of weight. This is of particular value where the film is advanced intermittently, as is the case in the commercial machines of the day. At the same time it will be seen that although the resilient guide is flexible laterally of the film, its maximum stiffness occurs in the direction of film travel. This eliminates noise.

It will be obvious that my invention is useful not only for either intermittent or continuous film driving machines but also for feed sprockets, take-up sprockets, sound sprockets or projector sprockets on cameras, projectors or other motion picture machines.

What is claimed is:

1. High-speed sprocket wheel mechanism for intermittently driven motion picture film comprising a film sprocket and a fixed shoulder on one end to guide one edge of the film in a fixed line, in combination with a resilient guide for the other edge adjacent the other end of the sprocket and revolving about a different center than the sprocket, said guide comprising a single disk having a shaft less in length than the width of the film, a spring therefor and needle-point bearings for said disk and shaft located peripherally beyond the sprocket wheel in such a position that the side of the disk contacts the edge of the film resiliently near the periphery of the disk, whereby the film is held against the fixed guide and wear and tear on the sprocket teeth and holes in the film are decreased and noise eliminated.

2. A high-speed sprocket wheel mechanism for intermittently driven motion picture film comprising a film sprocket and a fixed shoulder on one end of the sprocket to guide one edge of the film in a fixed line, in combination with a resilient guide for the edge adjacent the other end of the sprocket and revolving about a different center than the sprocket, said center being axially off center with relation to the edge of the film and outside the sprocket, and a spring adjacent the revolving guide and revolving therewith to hold it against the film, whereby the film is held against the fixed guide and wear and tear on the sprocket teeth and holes in the film are decreased and noise eliminated.

EWALD BOECKING.

REFERENCES CITED

The following references are of record in the file of this patent:

UNITED STATES PATENTS

| Number | Name | Date |
| --- | --- | --- |
| 1,269,366 | Barnes | June 11, 1918 |
| 1,815,692 | Von Madaler | July 21, 1931 |
| 1,854,004 | Tschopp | Apr. 12, 1932 |
| 2,312,760 | Heidegger | Mar. 2, 1943 |